US011460091B2

(12) United States Patent
Jaeker et al.

(10) Patent No.: US 11,460,091 B2
(45) Date of Patent: Oct. 4, 2022

(54) ENERGY CHAIN WITH DAMPING ELEMENTS AS WELL AS SIDE PART THEREFOR

(71) Applicant: Igus GmbH, Cologne (DE)

(72) Inventors: Thilo-Alexander Jaeker, Sankt Augustin (DE); Joerg Dommnik, Neunkirchen-Seelscheid (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 17/048,439

(22) PCT Filed: Apr. 11, 2019

(86) PCT No.: PCT/EP2019/059301
§ 371 (c)(1),
(2) Date: Oct. 16, 2020

(87) PCT Pub. No.: WO2019/201748
PCT Pub. Date: Oct. 24, 2019

(65) Prior Publication Data
US 2021/0088111 A1    Mar. 25, 2021

(30) Foreign Application Priority Data

Apr. 18, 2018 (DE) ...................... 20 2018 102 144.3

(51) Int. Cl.
*F16L 3/015* (2006.01)
*F16G 13/16* (2006.01)
(Continued)

(52) U.S. Cl.
CPC .............. *F16G 13/16* (2013.01); *F16F 15/08* (2013.01); *F16L 3/015* (2013.01); *H02G 11/006* (2013.01); *F16F 2224/02* (2013.01)

(58) Field of Classification Search
CPC ..... F16L 3/015; F16L 3/01; F16L 3/00; F16G 13/16; F16F 15/08; F16F 2224/02; H02G 11/006; H02G 3/0406; H02G 3/0456
(Continued)

(56) References Cited

U.S. PATENT DOCUMENTS 5,174,104 A * 12/1992 Wehler .................... F16G 13/16
248/49
5,771,676 A *  6/1998 Komiya ............... H02G 11/006
59/78.1
(Continued)

FOREIGN PATENT DOCUMENTS

CN     106151379     11/2016
CN     205991137      3/2017
(Continued)

OTHER PUBLICATIONS

International Search Report from corresponding PCT Appln. No. PCT/EP2019/059301, dated Jul. 22, 2019.
(Continued)

*Primary Examiner* — Nkeisha Smith
(74) *Attorney, Agent, or Firm* — Grossman, Tucker, Perreault & Pfleger, PLLC

(57) ABSTRACT

An energy guiding chain and side part therefore are proposed. In energy guiding chains, the pivotability of connected chain links against each other is typically limited by cooperating abutments with abutment surfaces arranged on the side parts. The invention concerns elastically deformable damping elements which dampen the abutting motion of the areas between the abutments and the abutment surfaces. In accordance with the invention, at least some abutments have a damping bow which is convexly curved in the direction of the respective other abutment surface and behind which a free space is provided, both ends of the damping bow being firmly connected to the respective abutment in the manner of
(Continued)

an arched bridge. Furthermore, the damping bow is connected in one piece to the inner wall of the respective side part facing the inner guide channel.

10 Claims, 3 Drawing Sheets

(51) Int. Cl.
  *F16F 15/08* (2006.01)
  *H02G 11/00* (2006.01)
(58) Field of Classification Search
  USPC .................................................. 248/583, 584
  See application file for complete search history.

(56) References Cited

U.S. PATENT DOCUMENTS

| | | | |
|---|---|---|---|
| 6,107,565 A * | 8/2000 | O'Rourke | H02G 11/006 174/101 |
| 6,167,689 B1 * | 1/2001 | Heidrich | F16G 13/16 248/49 |
| 6,481,195 B1 | 11/2002 | Blase | |
| 6,745,555 B2 * | 6/2004 | Hermey | H02G 11/006 59/78.1 |
| 6,978,595 B2 * | 12/2005 | Mendenhall | F16G 13/16 248/49 |
| 6,992,254 B2 | 1/2006 | Komiya | |
| 7,334,388 B2 | 2/2008 | Eckl et al. | |
| 7,444,800 B2 * | 11/2008 | Hermey | H02G 11/006 59/78.1 |
| 7,497,072 B2 * | 3/2009 | Hermey | F16G 13/16 59/78.1 |
| 7,591,128 B2 * | 9/2009 | Komiya | H02G 11/00 59/78.1 |
| 7,966,800 B2 * | 6/2011 | Kemper | F16G 13/16 59/78.1 |
| 8,459,000 B2 | 6/2013 | Harada | |
| 2019/0145497 A1 * | 5/2019 | Dommnik | F16G 13/16 59/78.1 |
| 2020/0135366 A1 * | 4/2020 | Hermey | H02G 15/007 |

FOREIGN PATENT DOCUMENTS

| | | |
|---|---|---|
| DE | 29607492 | 10/1997 |
| DE | 29806969 | 7/1998 |
| DE | 10339168 | 4/2005 |
| DE | 102005026667 | 12/2005 |
| DE | 102012106400 | 1/2013 |
| DE | 202016002624 | 8/2017 |
| GB | 2515242 | 12/2014 |

OTHER PUBLICATIONS

International Preliminary Report on Patentability from corresponding PCT Appln. No. PCT/EP2019/059301, dated May 28, 2020.

* cited by examiner

ENERGY CHAIN WITH DAMPING ELEMENTS AS WELL AS SIDE PART THEREFOR

FIELD

The invention relates to an energy chain with a guide channel for guiding hoses, cables or the like between two connection points, at least one of which is non-stationary, having a plurality of chain links which are composed of side parts and cross bars and which are connected together in an articulated manner, wherein the pivotability of adjacent or subsequent chain links relative to one another is limited by cooperating abutments and abutment surfaces, which are arranged on the side parts, and wherein there are provided resiliently deformable damping elements which damp abutting of the regions between the abutments and the abutment surfaces. The invention also relates to a side part as such that is having the features according to the invention.

BACKGROUND

An energy chain of this type is known from DE 296 07 492 U1. Herein, the damping elements are in the form of spring lips, which protrude obliquely from the respective abutment and, upon striking the abutment surface of the following chain link, bend resiliently in the direction towards the respective abutment. Such damping elements have already proved very successful in practice. When the spring lips are bent towards the respective abutment upon striking the abutment surfaces, tensile forces are generated on the upper side of the spring lips and compressive forces are generated on the lower side. The materials from which energy chains are produced are largely insensitive to compressive forces. If, however, tensile forces occur, there is the risk that material fatigue will occur in the materials, in particular in the case of plastics, which contributes towards reducing the service life of the energy chain in question.

In WO 2017/182494 A1 Applicant has already proposed a further development of an energy chain side part with damping element. In this case, the damping element is also a spring lip that can be deformed resiliently.

A further design for shock absorption of the generic type as set out above has been proposed in patent document CN106151379A or in utility model CN205991137U, which also shows the features of claim preamble.

DE 10 2005 026 667 A1 reveals a cable chain with side parts that have V-shaped abutment surfaces that, when pivoted, come into partial point contact with contact regions of the abutments of a following side part. This allows air between the abutment surfaces and abutments to escape, thus reducing collision noise. In addition, the cylindrically shaped abutments are elastically deformable as a whole.

DE 103 39 168 A1 reveals a side part for a cable drag chain, which has shell-shaped or concave and elastically deformable damping elements on abutment surfaces which, when pivoted, interact with abutments of a following side part. The clear width of the damping element according to DE 103 39 168 A1 is slightly smaller than the diameter of the interacting abutment, so that the damping element expands when the abutment strikes. Therefore, the damping elements according to DE 103 39 168 A1 are subject to wear.

SUMMARY

Accordingly, the object underlying the invention is to prolong the service life of energy chains and in particular, to prolong the service life of the damping elements, whilst preferably also improving the damping behavior between the chain links in the deflection regions (bending regions).

According to the invention, the object is achieved in that at least some of the abutments have in their contact regions in which they come into contact with the abutment surfaces at least one damping bow which is curved convexly in the direction towards the respective abutment surface, in that a free space is provided behind the damping bow, and in that both ends of the damping bow are fixedly connected to the respective abutment in the manner of an arched bridge. In accordance with the invention, the damping bow can be connected to the inner wall of the respective side part, i.e. the wall facing the inner guide channel, in particular in the lateral direction at least in a partial area between the ends of the damping bow or over its entire dimension. This additional connection of the damping bow can in particular be a one-piece or integral connection, preferably homogenous (made of the same material), with the rest of the body of the side plate. This results in a relatively stable construction and further increases the service life.

Not only do the curved damping bows create an optimal damping effect; when they are deformed, substantially only compressive forces occur, as are predominant, for example, in the case of arched bridges. Tensile forces, which can lead to material fatigue, do not occur in the construction according to the invention or occur to only a very small extent. This already noticeably improves the service life, especially if quite rigid plastics with low elasticity are preferably used.

In combination with the connection of the bow bridges with the inner wall of the side part, i.e. in the lateral direction with respect to the bow length, a particularly robust and durable construction is achieved, as the bow bridges are thereby supported or stabilized. In addition, the degree of deformability of the bow bridge can be adjusted as required via an additional degree of freedom, depending on the dimensions of the connection with the side wall.

Furthermore, it is foreseen that the inner wall of the side part is recessed in the area of the damping bow. Preferably, a first recess opening into or connected to the free space as well as an opposite second recess can be provided. Both recesses are recessed in relation to the surrounding area of the surface of the inner wall. This considerably simplifies the manufacture of the bow bridge when using injection-moulding technology, as no expensive tools with means for creating undercuts are required. In addition, the dimensioning of the recess allows sufficient flexibility or deformability of the bow bridge despite the stabilizing connection of the bow bridge with the inner wall, and shear forces on the stabilizing connection can be avoided.

The recesses face the broad sides of the bow bridge and are spatially limited. Both recesses are preferably limited in the longitudinal direction to a dimension which corresponds approximately to the length of the bow bridge or deviates from it only slightly, e.g. by +/−20%. In height direction, each recess should at least correspond to the bow height.

In a preferred embodiment the recesses have a recess depth of at least 50% of the surrounding wall thickness in relation to the surface of the inner wall and/or the depth (viewed in the direction of the material thickness of the side plate) of the recess is at least 33% of the width of the damping bow perpendicular to the longitudinal direction. This results in a particularly good deformability despite the connection with the inner wall.

The side parts of which the energy chain according to the invention is composed can consist in a manner known per se of appropriate plastics and can be produced, in particular in one piece or from a single material by an injection-molding process. Fiber-reinforced polymers, e.g. a polyamide, with comparatively high stiffness, are particularly suitable.

In such a construction, the damping bows can be integrally formed at both their ends with the associated abutment. Not only is this particularly advantageous from the point of view of production; a very good damping effect is also achieved with such integrally formed damping bows.

Preferably, a curved damping bow is provided on both sides of the abutments—that is to say both on the upper side thereof and on the lower side thereof—so that the advantageous damping effect is achieved both in the bending procedure of the energy chain and in the extending procedure. In other words, a curved damping bow in accordance with the invention is preferably provided for both swivel directions i.e. into the fully angled position present in the deflection bend and into the fully stretched position respectively, the latter with pretension if necessary.

The radius of the curve of the damping bow is advantageously comparatively large, so that the curve is relatively flat. A flat curve is sufficient to achieve the desired damping effect. When the flatly curved damping bow is deformed, almost exclusively a compression effect occurs during its deformation, so that tensile stresses in the deformed bow can largely be avoided.

The ratio of the chord length of the curve to the height can be approximately 20:1, preferably at least 10:1.

Preferably, the respective damping bow extends over the entire width of the associated abutment. The pressure that occurs in the event of damping is thereby distributed over the entire width of the abutment.

Advantageously, the damping bow and the free space located behind it extend transversely to the longitudinal direction of the respective side part. Owing to this construction, the deformation effect of the damping bow is optimized. The term "behind", which refers to the position of the free space relative to the damping bow, refers to the direction of action of the abutment, i.e. the side facing away from the effective abutment surface, the latter being the front side of the damping bow. The abutment surfaces preferably strike one another flatly and are preferably perpendicular to the main plane (i.e. the plane which is spanned by the longitudinal direction and the height of the side plate) of the side plate, i.e. in the direction of the width or material thickness of the side plate.

BRIEF DESCRIPTION OF THE DRAWINGS

The invention is illustrated by way of example, without limiting the claim scope, in the drawing and described in detail herein below with reference to the drawing, in which:

DETAILED DESCRIPTION OF THE DRAWINGS

Figure 1:
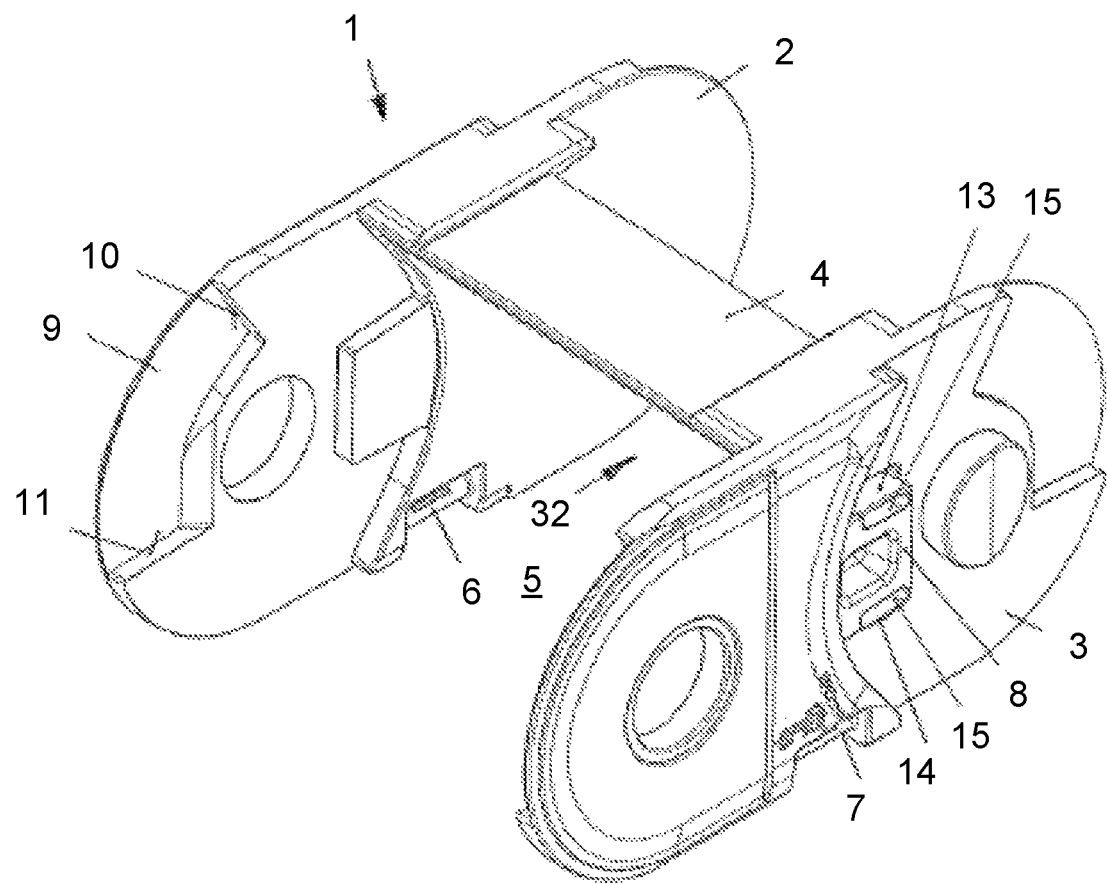
FIG. 1 is a perspective view of a chain link of an energy chain according to the invention.

According to FIG. 1 of the drawing, the chain link 1 has two side parts 2 and 3, which are connected together by means of a cross bar 4 in their region, which is at the top in the drawing. The region of the two side parts 2 and 3 which is at the bottom in the drawing is connected by means of a further cross bar, which is not shown in the drawing. A guide channel 5 is formed between the two side parts 2 and 3 and the two cross bars, which guide channel is to serve for receiving hoses, cables and the like.

The lower cross bar, not shown in the drawing, is openable, so that access to the guide channel 5 is possible, in order to insert the hoses, cables and the like into the energy chain. With regard to the lower cross bar, only the mounts 6 and 7 are shown on the side part 2 and 3, at least one of which mounts is in the form of a hinge axis.

In the deflection regions of the energy chain, the chain links 1 must be pivoted relative to one another through a given angle. In order to limit the pivot angle, there are provided on each of the side parts 2 and 3 a abutment 8 and a cutout 9 having an upper abutment surface 10 and a lower abutment surface 11, the designations "upper" and "lower" referring only to the representation according to FIGS. 1 and 2.

Figure 4:
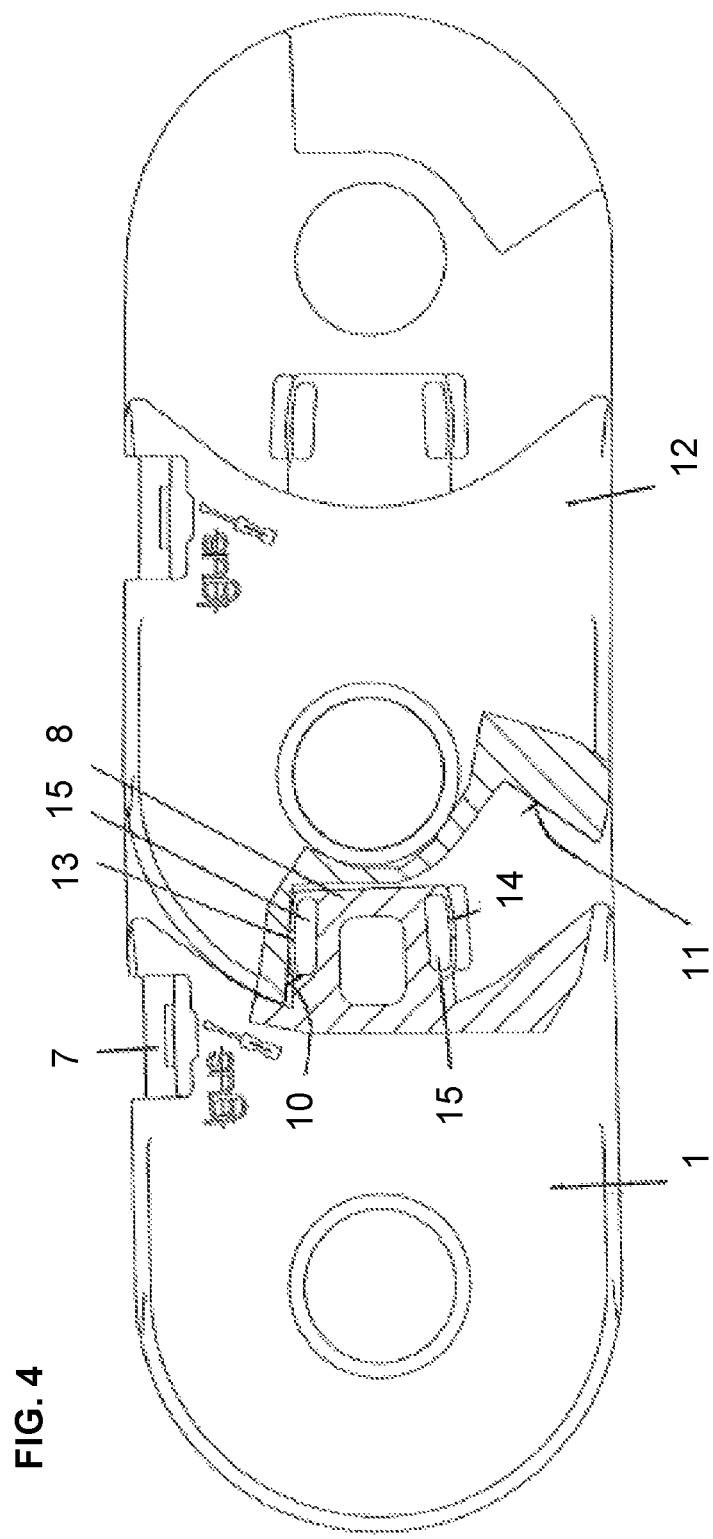
FIG. 4 is a side view, partially in section, of two chain links connected together.

The abutments 8 each cooperate with the abutment surfaces 10 and 11 of the following chain link 12 shown in FIG. 4.

Rapid movement of the energy chains was in the past often associated with considerable noise emission, which was perceived as troublesome. For that reason, damping elements came to be provided between the abutments 8 and the abutment surfaces 10 and 11.

In the exemplary embodiment shown in the drawing, the abutments 8 are equipped in their contact regions in which they come into contact with the abutment surfaces 10 and 11 of the following chain link 12 with convexly curved damping bows 13 and 14 in their lateral regions, the convexly curved regions in each case being oriented in the direction towards the corresponding abutment surface 10 or 11.

Behind each damping bow 13 or 14 there is provided a free space 15. When the respective damping bow 13 or 14 strikes the corresponding abutment surface 10 or 11, the damping bow 13 or 14 is able to give way into the free space 15 slightly.

The damping bows 13 and 14 are constructed in the manner of an arched bridge, their two ends being fixedly connected to the abutment 8.

Owing to the bridge-like form of the damping bows 13 and 14, predominantly compressive forces are generated in their material during their deformation.

The chain links according to the invention are generally produced in one piece from plastics material, the respective damping bows 13 and 14 being integrally formed at their two ends with the associated abutment 8.

The plastics material used to produce energy chains can readily absorb compressive stresses without substantial material fatigue occurring as a result. In this respect, on account of the fact that almost exclusively compressive forces occur upon deformation of the damping bows 13, 14, the service life of the energy chains equipped with the features according to the invention can be prolonged considerably.

The radius of the curve of the damping bows 13 and 14 is chosen to be comparatively large, so that the curve is thus relatively flat and the degree of deformation of the damping bows 13 and 14 is relatively small. The ratio of the chord length of the curve to the height is approximately 20:1 in the exemplary embodiment shown in the drawing.

According to the embodiment shown in the drawing, the respective damping bow 13 or 14 extends over the entire width of the associated abutment 8, so that the contact pressure is distributed uniformly over the entire width of the abutment 8. The damping bows 13 and 14 and also the free space 15 located behind them extend transversely to the longitudinal direction of the respective side part 2 or 3.

In the exemplary embodiment shown in the drawing, the damping bows 13 and 14 are connected to the wall of the respective side part 2 or 3 that faces towards the inner guide channel 5.

Alternatively, however, an embodiment is also possible in which the wall of the respective side part 2 or 3 that faces towards the inner guide channel 5 is recessed in the region of the respective damping bow 13 or 14. In such an embodiment, the respective damping bow 13 or 14 is thus not connected to the inside wall of the respective side part 2 or 3 and as a result can be compressed uniformly over its entire width upon striking the respective abutment surface 10 or 11.

FIG. 4 shows a portion of the upper run of an energy chain, consisting of two chain links 1 and 12 connected together. The upper abutment surface 10 of the chain link 12 on the right in the drawing is resting on the abutment 8 of the chain link 1, the upper damping bow 13 of the abutment 8 being depressed slightly.

In the turnaround region of the energy chain, that is to say when one of the two chain links pivots downwards, the lower abutment surface 11 of the chain link 12 strikes the lower damping bow 14, which at the moment of impact gives way slightly into the free space 15.

When the chain links 1 and 12 pivot again into the horizontal region of the lower run, the abutment surface 10 comes into contact again with the damping bow 13 facing it.

Figure 3:
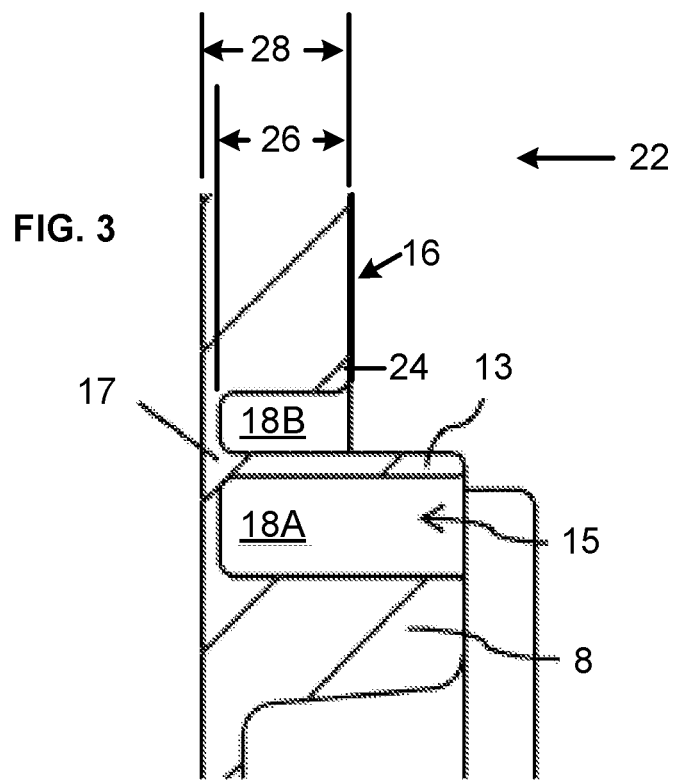
FIG. 3 is a partial cross-section perpendicular to the longitudinal direction, along line from FIG. 2.

As best seen from FIG. 3, each damping bow 13, 14 is connected with the inner wall 16 pointing to the guide channel 5 or with the surrounding body of the respective side part 2, 3, along its side that faces away from the guide channel 5 and between both ends over a partial length or preferably completely continuously. This connection is via a connecting region 17 that is homogenous i.e. uniformly having the same material as the damping bow 13, 14.

Figure 2:
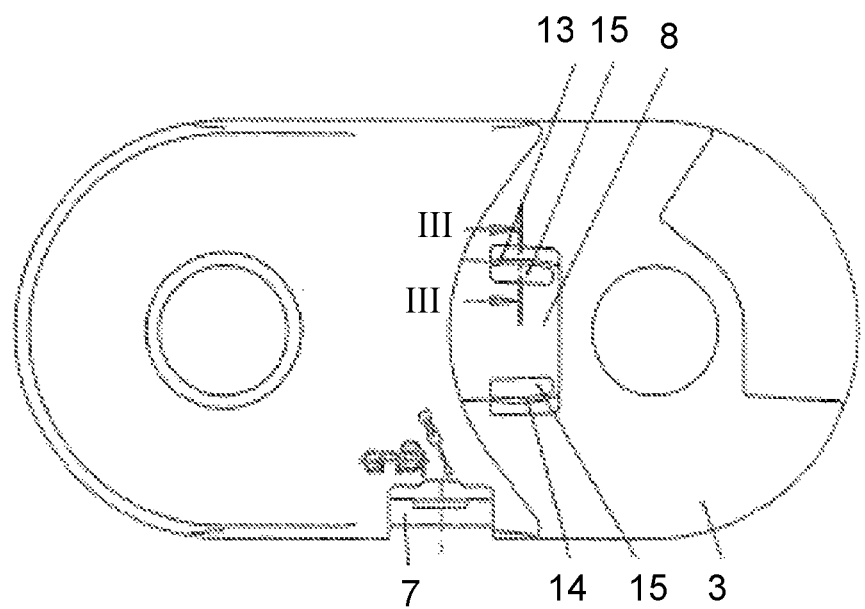
FIG. 2 is a side view of the chain link according to FIG. 1.

As can also be seen in FIG. 2, the inner wall 16 of the side part 2, 3 is recessed in the area of the damping bow 13, 14. Above and below the damping bows 13, 14 respectively, two recesses 18A, 18B are provided opposite the surface of the inner wall 16. These recesses 18A, 18B are injection moulded together with the side plate 2, 3 as recesses in relation to the damping bow 13, 14 and the material area remaining between them forms the damping bow 13, 14. The recesses 18A, 18B are recessed by a measure corresponding to at least 50% of the surrounding wall thickness and have a depth in FIG. 3, which is almost 50% of the width of the damping bow 13, 14 in the plane of FIG. 3 i.e. transverse to the longitudinal direction.

As FIG. 3 shows, a rear recess 18A is openly connected to or forms the free space 15 and a front or opposite recess 18B is provided on the other side of the damping bow 13, 14. The rear recess 18A, viewed laterally, is located completely within the abutment 8. Both recesses 18A, 18B have the same depth and similar base area in lateral view (FIG. 2), each being notably smaller than the protruding abutment 8, as can be seen from FIG. 2. If the recesses 18A, 18B are sufficiently deep, in case of a damping deformation of the damping bows 13, 14 only slight torsion occurs over the connection region 17, whereas the desired effect of the arch bridge predominantly occurs, i.e. a resulting predominant compressive load, which is introduced via the ends of the damping bows 13, 14 into the load-bearing solid body areas of the abutment 8.

By means of the construction according to the invention, it is consequently possible, with very simple means, to achieve optimal noise damping of energy chains. Moreover, on account of the advantageous stress ratios in the damping bows 13 and 14, material fatigue in those regions can largely be avoided and as a result the service life of an energy chain can be prolonged considerably.

LIST OF REFERENCE NUMERALS 1 chain link
2 side part
3 side part
4 cross bar
5 guide channel
6 mount
7 mount
8 abutment
9 cutout
10 abutment surface
11 abutment surface
12 following chain link
13 damping bow (arched bridge)
14 damping bow (arched bridge)
15 free space
16 inner wall of side part that faces towards the guide channel
17 connection region
18A first recess opening to the free space 15
18B second recess
22 lateral direction
24 surrounding surface of inner wall
26 depth of recess
28 surrounding wall thickness
32 longitudinal direction

What is claimed is:

1. An energy chain with a guide channel to guide at least one line between two connection points, at least one of the two connection points being non-stationary, comprising:
   a plurality of chain links each composed of side parts and cross bars, respectively, and of which adjacent chain links are connected together in an articulatable manner,
   wherein a pivotability of the adjacent chain links relative to one another is limited by cooperating abutments and abutment surfaces, which are arranged on the side parts,
   wherein resiliently deformable damping elements are provided which damp abutting of the cooperating abutments and abutment surfaces,
   wherein, in a contact region of each abutment of the abutments which comes into contact with a respective abutment surface of the abutment surfaces, at least some of the abutments respectively comprise at least one damping bow which is curved convexly in a direction towards the respective abutment surface,
   wherein a free space is provided behind the at least one damping bow of a respective abutment,
   wherein ends of the at least one damping bow are fixedly connected to the respective abutment in a manner of an arched bridge, and
   wherein the at least one damping bow is connected in a lateral direction, at least in a partial area between the ends of the at least one damping bow or over an entire dimension of the at least one damping bow, via a connecting region to an inner wall of a side part of the side parts that faces towards the guide channel, wherein the inner wall of the side part is recessed in an area of the at least one damping bow and presents a first recess opening to the free space as well as an opposite second recess, the first and second recesses being recessed in relation to a surrounding surface of the inner wall.

2. The energy chain according to claim 1, wherein the first and second recesses have a depth of the recesses, with respect to the surrounding surface of the inner wall, amounting to at least 50% of a surrounding wall thickness.

3. The energy chain according to claim 1, wherein each of the side parts is formed of plastics material.

4. The energy chain according to claim 3, wherein each of the side parts is formed in one piece, and the at least one damping bow of each respective abutment is integrally formed at ends thereof with each respective abutment.

5. The energy chain according to claim 1, wherein the at least one damping bow comprises a plurality of damping bows, and wherein the plurality of damping bows are arranged on different sides of the respective abutment.

6. The energy chain according to claim 5, wherein the plurality of damping bows are curved.

7. The energy chain according to claim 1, wherein the at least one damping bow has a curve, and a ratio of a chord length of the curve to a height of the curve is at least 10:1.

8. The energy chain according to claim 1, wherein the at least one damping bow extends at least over the entire width of the respective abutment when viewed transversely to a longitudinal direction.

9. The energy chain according to claim 1, wherein the at least one damping bow and the free space located behind the at least one damping bow extend transversely to a longitudinal direction of a side part.

10. Side parts for an energy chain with a guide channel to guide at least one line between two connection points, at least one of the two connection points being non-stationary, the energy chain having a plurality of chain links, and of which adjacent links are connected together in an articulatable manner relative to one another, the side parts comprising:

a first side part having an abutment, a second side part having abutment surfaces, wherein the abutment of the first side part is arranged to limit pivotability of the adjacent chain links connected together in the articulable manner relative to one another by cooperating with the abutment surfaces of the second side part, wherein, in a first contact region of the abutment which comes into contact with a first abutment surface of the abutment surfaces, the abutment comprises a first damping bow which is curved convexly in a direction towards the first abutment surface, wherein, in a second contact region of the abutment which comes into contact with a second abutment surface of the abutment surfaces, the abutment comprises a second damping bow which is curved convexly in a direction towards the second abutment surface, wherein a free space is provided behind each of the first and second damping bow, respectively, wherein each of the first and second damping bow is fixedly connected to the abutment in a manner of an arched bridge, respectively, and wherein each of the first and second damping bow is connected in a lateral direction, at least in a partial area between the ends thereof or over an entire dimension thereof, via a respective connecting region to an inner wall of the first side part, wherein the inner wall of the first side part is recessed in an area of the first and second damping bows, respectively, and presents a first recess opening into to the free space as well as an opposite second recess, respectively, the first and second recess being recessed in relation to a surrounding surface of the inner wall, respectively.

* * * * *